May 5, 1970  M. J. DYKMANS  3,510,041
MEANS AND TECHNIQUES FOR TENSIONING WIRE
Filed April 3, 1968  3 Sheets-Sheet 3
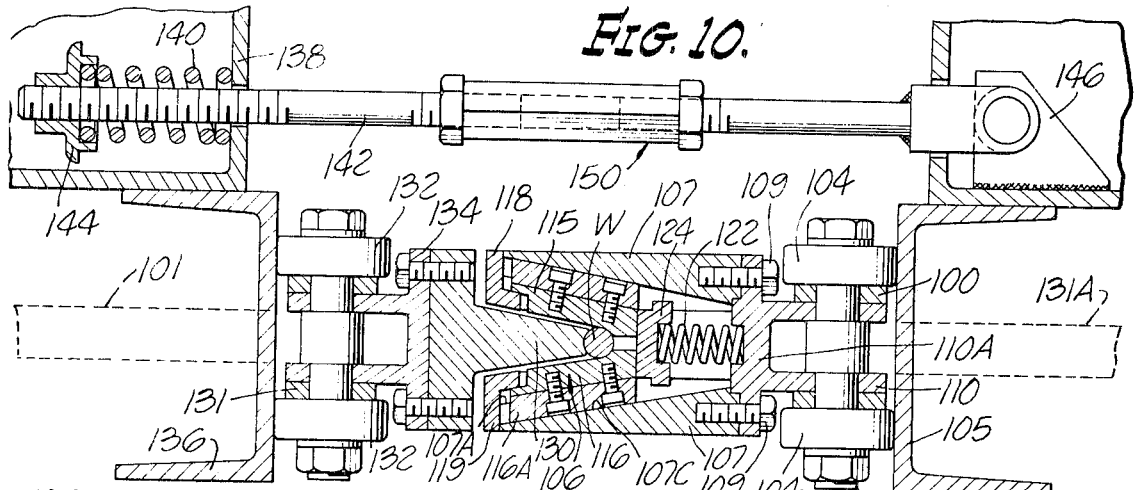
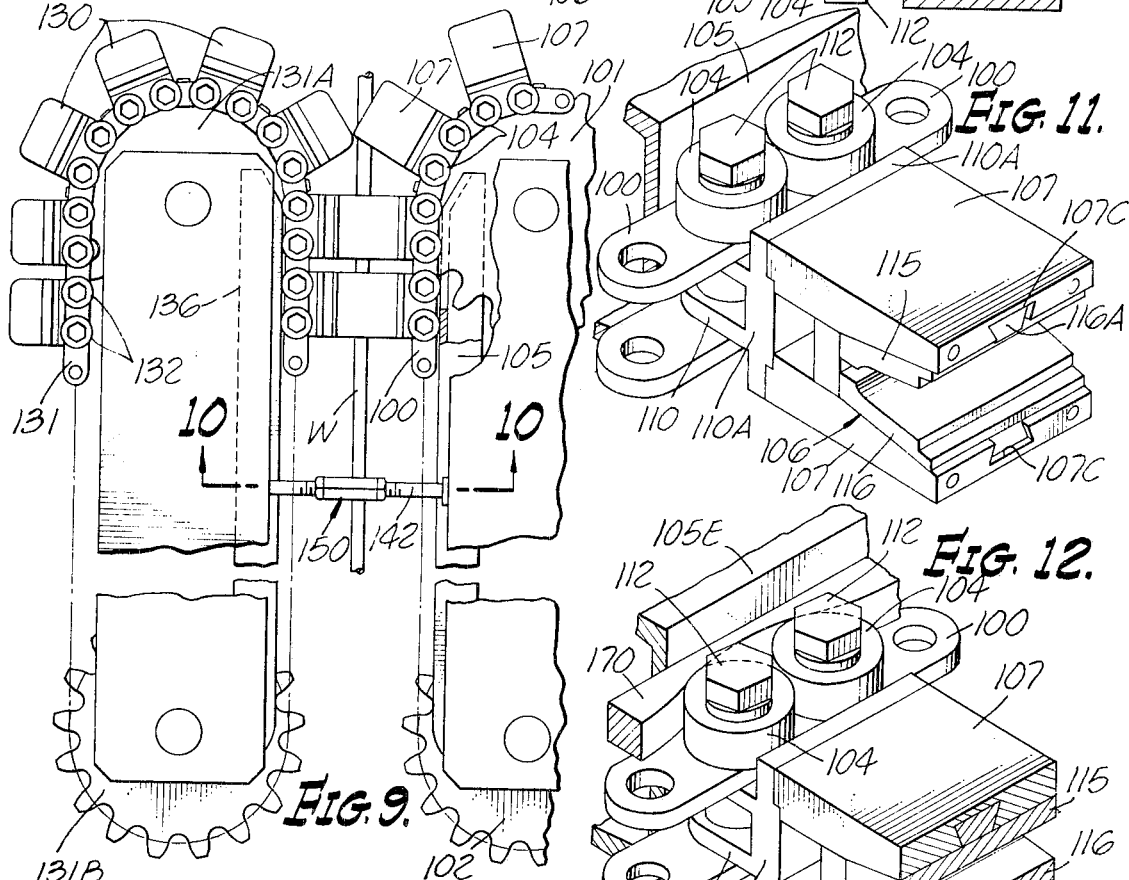
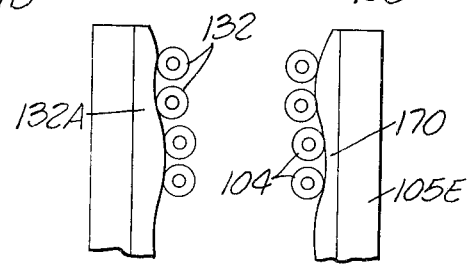
INVENTOR.
MAXIMILIAAN J. DYKMANS
BY
Lyon & Lyon
ATTORNEYS United States Patent Office 3,510,041
Patented May 5, 1970

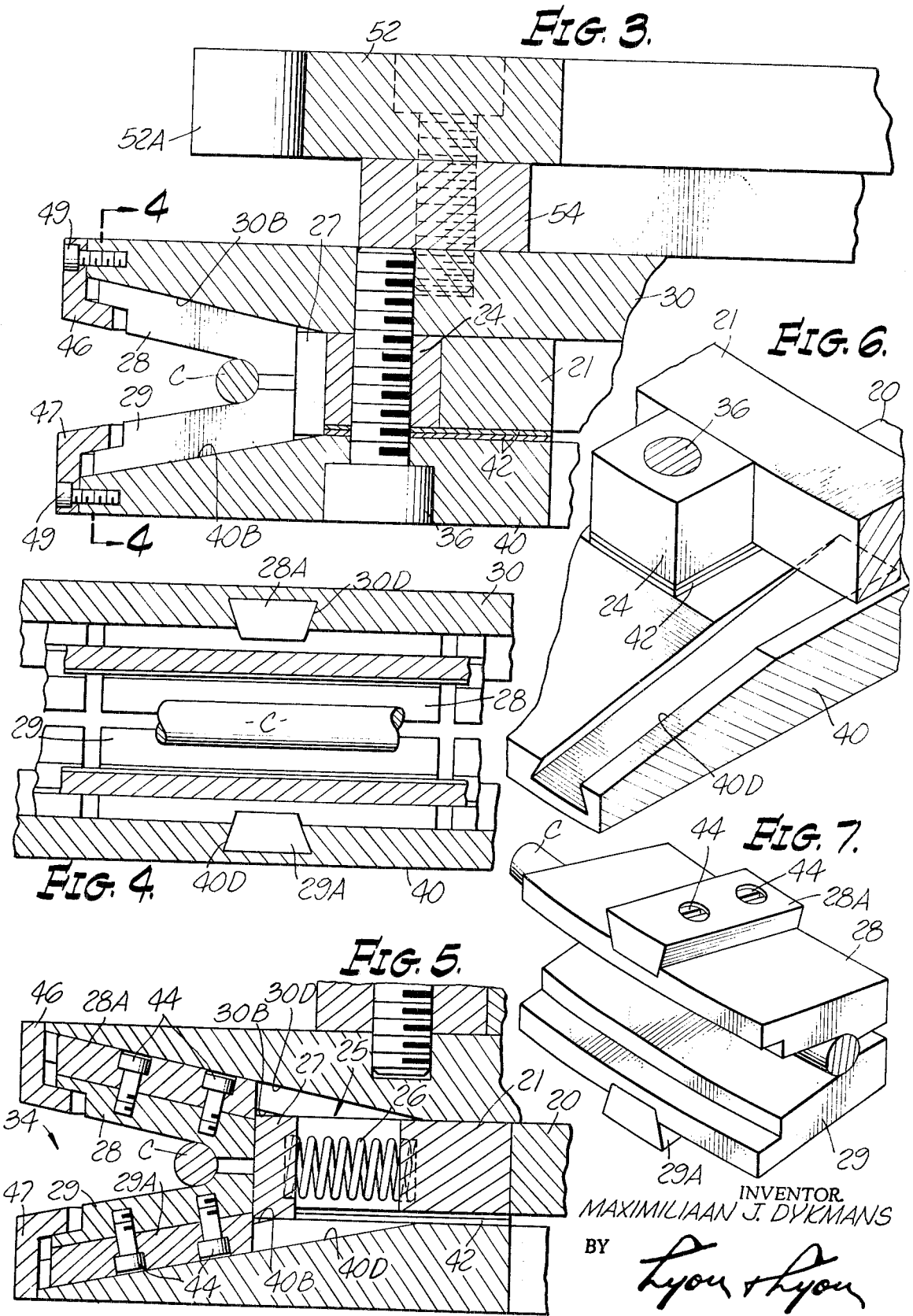

3,510,041
MEANS AND TECHNIQUES FOR TENSIONING WIRE
Maximiliaan J. Dykmans, 4434 Mayapan Drive, La Mesa, Calif. 92041
Filed Apr. 3, 1968, Ser. No. 718,463
Int. Cl. B65h *17/34*
U.S. Cl. 226—172                                16 Claims

ABSTRACT OF THE DISCLOSURE

A rotatable cable or wire gripping device has a peripheral V-shaped grooved portion within which a series of pairs of gripping jaws is disposed. Each pair of jaws has its own spring means acting independently to wedge a cable between a pair of jaws. A sprocket wheel connected to the gripping device rotates the same. The cable is wrapped around the practical maximum periphery of the gripping device with spring means acting on the cable where it first engages the gripping device to produce good gripping action with the first pair of jaws engaged by the cable. In a modification a series of such gripping jaws is mounted on an endless chain passing over spaced sprocket wheels and finger members on an adjacent chain press a generally straight section of wire into such jaws, and in a further modification the gripping jaws travel along an undulating path to cause the wire being gripped to have a corresponding undulatory shape for enhanced gripping.

---

The present invention relates to improved means and techniques for gripping and tensioning cable, wire, strands, and the like and is particularly useful in wire wrapping of circular concrete structures in the process of prestressing the same although it will be appreciated that the same may be used in other applications such as, for example, in the laying of cable. Such gripping device when so used may provide the desired tension in the cable or wire so wrapped or laid. It is therefore a general object of the present invention to provide means and techniques useful in handling of wire, cable, strands, and the like.

A specific object of the present invention is to provide an improved gripping device of this character whereby wire or cable of relatively large size diameter may be wrapped around a concrete structure with the cable or wire so wrapped being maintained under large tension forces.

Another specific object of the present invention is to provide an improved gripping device of this character in which there is a plurality of individual and independently mounted spring-urged cable gripping jaws of special configuration and operating such that each of the jaw pairs engaging the cable at any particular time contributes substantially to the production of the desired stress in the cable being wrapped around, for example, a circular concrete structure.

Another specific object of the present invention is to provide an arrangement of this character involving spring-urged cable engaging jaws operating in conjunction with a spring-urged means for pressing the cable into good gripping engagement with the first pair of jaws engaged by the cable.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 3 is a sectional view taken as indicated by the line 3—3 in FIG. 1.

FIG. 4 is a sectional view taken as indicated by line 4—4 in FIG. 3.

FIG. 5 is a sectional view taken as indicated by lines 5—5 in FIG. 2.

FIGS. 6 and 7 are perspective views illustrating details of the gripping mechanism.

FIG. 9 illustrates a portion of a modified construction also embodying features of the present invention.

FIG. 10 is a sectional view taken as indicated by the line 10—10 in FIG. 9.

FIG. 11 illustrates in perspective a portion of the structure shown in FIGS. 9 and 10.

FIG. 12 is a view like FIG. 11 but of a modified form also embodying features of the present invention.

FIG. 13 illustrates further details of the modification shown in FIG. 12.

Figure 1:
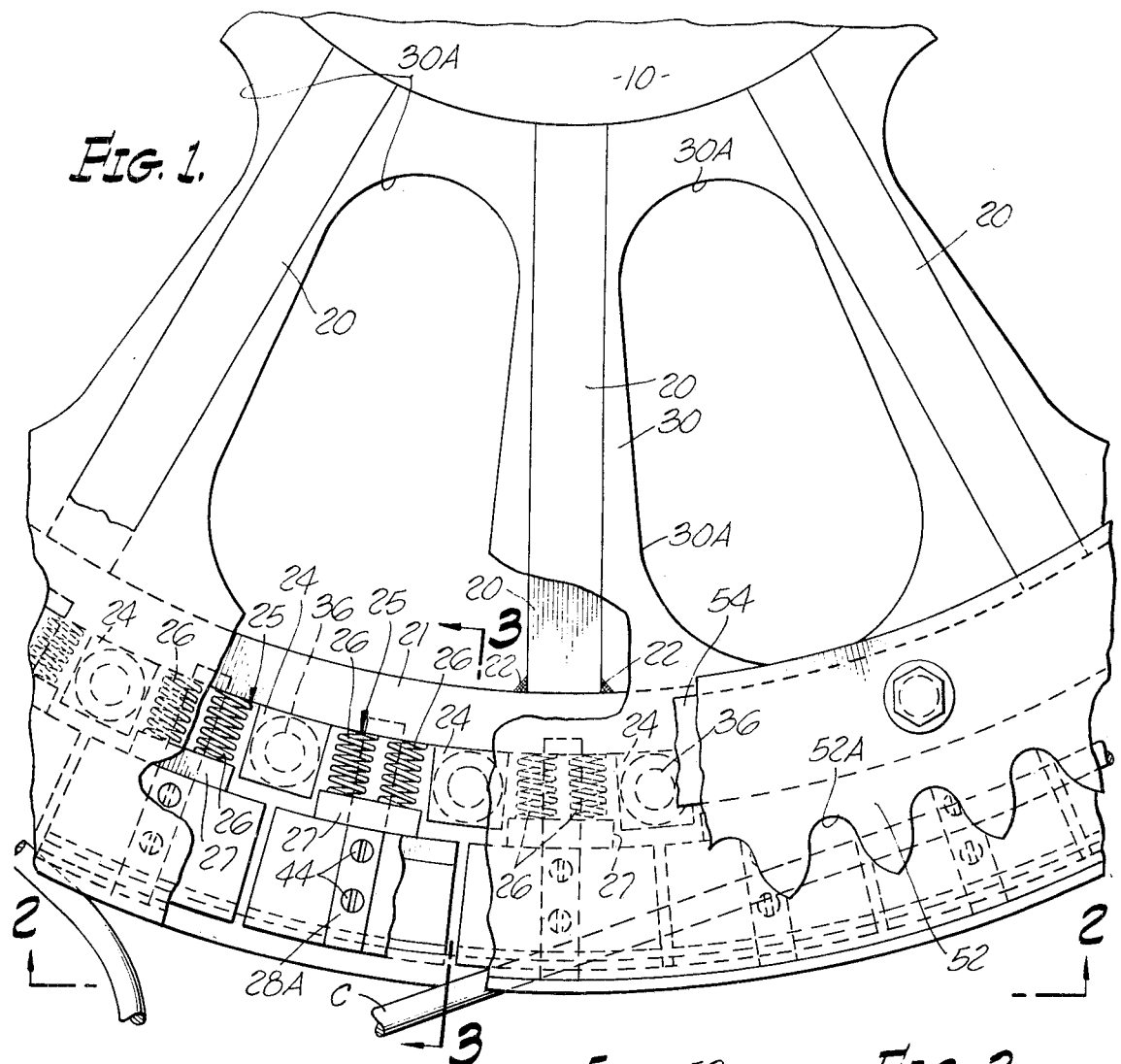
FIG. 1 is generally a view in elevation, with some of the parts broken away, of a gripping mechanism embodying features of the present invention and also illustrates the end portions of a wire or cable wrapped around the same.
Figure 2:
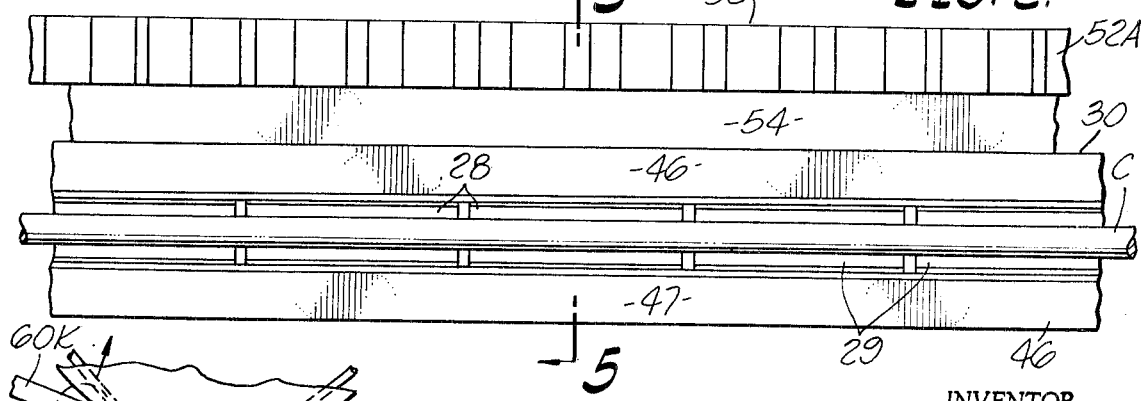
FIG. 2 is a view of the same taken as indicated by line 2—2 in FIG. 1.

The gripping device is in the form of a rotatable wheel having a central hub portion 10 to which is joined radially extending spokes 20 and a member 30 in the form of a disk which has a series of apertured portions 30A for weight reduction purposes.

The spokes 20 terminate at a ring 21 which may be welded thereto as indicated by the weld 22. The outer surface of ring 21 has secured thereto as, for example, by welding, a series of spaced blocks 24 which define in general a series of peripheral pockets 25 within each of which is disposed a pair of compression springs 26 and a small slidable pressure plate 27 which may be guided by such spaced blocks. Each of such springs 26 has one of its ends bearing against a recessed portion of ring 21 and the other one of its ends bearing against a recessed portion in the pressure plate as illustrated in FIG. 5 so that such springs themselves serve also as alignment elements without necessarily the pressure plate 27 contacting the spaced blocks 24.

Each pair of such compression springs urges a pair of cable gripping jaws 28, 29 radially outwardly against the force developed in wrapping the cable C around this gripping device.

Each pair of jaws 28, 29 is slidably mounted for independent movement within a generally V-shaped peripheral grooved portion 34 which in general is defined by tapered faces 30B and 40B (FIG. 3) respectively on disc 30 and a ring 40, the ring 40 being secured to the disc member 30 by a series of bolts 36 which, as illustrated in FIG. 3, pass through apertured portions in ring 40 and block 24 and are threaded in the disc member 30 with different size shims 42 sandwiched between the ring 40, on the one hand and the assembly 24, 21 of block 24 and ring 21 on the other hand for adjustment of the spacing between the faces 30B, 40B on which the jaws 28, 29 are slidable.

For guiding such slidable movement of jaws 28, 29 each has secured thereto by bolts 44 a corresponding tapered guide block 28A, 29A (FIGS. 4 and 7) cooperating with tapered guide openings 30D, 40D formed respectively in discs 30 and ring 40. To retain such jaws 28, 29, particularly so in the absence of cable C a series of arcuate and L-shaped retaining members 46, 47 are respectively releasably secured to disc member 30 and ring 40 as for example by bolts 49.

This cable gripping assembly includes also a sprocket ring 52 for rotating the same by its engagement of its teeth 52A with a driven sprocket chain (not shown). The sprocket ring 52 may be spaced from the disc 30 using a spacer ring 54 with a series of fastening bolts passing through apertured portions of sprocket ring 52, spacer ring 54 and being threaded in disk 30.

The cable C is gripped and is rotated in the clockwise sense in FIG. 1 by a sprocket chain (not shown) engaging the sprocket wheel 52. An important feature is that the cable C contacts a practical maximum number of individual jaw pairs 28, 29 with a pressure being applied to the cable C where it first engages the gripping device of sufficient intensity so as to assure a good gripping action between the first pair of such jaws 28, 29.

Figure 8:
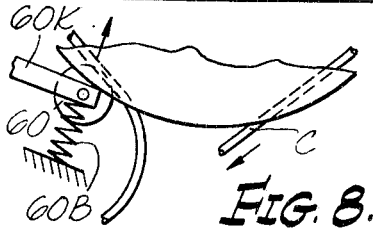
FIG. 8 is a view illustrating the manner in which the cable entering the gripping device is spring-urged into engagement with the device.

For these latter purposes as shown in FIGS. 1 and 8 the cable C is wrapped around the major peripheral portion of the gripping device and a spring-urged roller 60 rotatably supported on the pivoted arm 60K which is urged by compression spring 60B engages the cable C to urge it in good gripping engagement with the first pair of jaws 28, 29 contacted by the cable C against the action of the jaw springs 26.

In the modified forms of the invention shown in FIGS. 9–11 and also in FIG. 12 a substantially straight section of the cable is gripped by like gripping means mounted on an endless roller chain 100 passing around spaced sprocket wheels 101, 102.

Rollers 104 on chain 100 are engageable with a stationary bearing plate 105 which may be of channel iron stock and mounted on such chain 100 is a series of cable gripping devices 106 of the general character previously described, each involving a metal block 107 secured as, for example, by bolts 109 to the base portion 110A, of a corresponding one of a series of chain elements 110, such elements 110 being individually and pivotally mounted on chain pin 112 on which are also mounted the rollers 104.

The block 107 is formed with a generally V-shaped slotted portion 107A within which a pair of cable gripping jaws 115, 116 is slidably mounted and retained by a corresponding retainer 118, 119 releasably secured to block 107 as previously described. As previously, jaw 116 may be guided by a tongue element 116A thereon in groove 107C. Likewise a pair of coil compression springs 122 for each pair of jaws 115, 116 has one of its ends bearing on base plate 110A and the other one of its ends bearing against a pressure plate 124 to normally press the jaws 115, 116 outwardly against the stop or retainer elements 118, 119.

A plurality of cable pressing fingers 130 is in similar manner mounted on an adjacent reach of chain 131 passing over spaced sprocket wheels 131A, 131B having rollers 132 and a base member 134 to which such fingers 130 are secured. The rollers 132 ride on a spring-pressed track 136 to which an angle iron member 138 is secured.

For applying pressure to the fingers 130 and hence to the wire or cable W pressed wedged between jaws 115, 116 there is provided a series of coil compression springs 140, each of which is on a rod 142 passing through an apertured portion of member 138 and having on one end thereof an adjustably positioned washer 144 thereon serving as an adjustable seat for one end of spring 140, the other end of spring 140 bearing against member 138 and the other end of rod 142 may be pivoted to a bracket member 146 on stationary track 105.

In order to adjust the gripping power of this assembly during dynamic conditions in response to a condition as, for example, a stress or a difference in relative speeds, there may be provided a hydraulic cylinder-piston assembly as indicated at 150 with the cylinder portion of the same being pivoted on bracket 146 and the piston portion thereof extending through member 138 as shown. By regulating the pressure applied to such assembly it will be seen that the effective length of rod 142 may be altered to alter the gripping capability.

It will be appreciated that in order to obtain the wedging action of jaws 115, 116 the force exerted on the jaws 115, 116 by the springs 122 should be less than that force applied to the finger 130 such that the jaws 115, 116 are displaced from engagement with the stop members 118, 119 and preferably without however the springs 122 being fully compressed or "bottomed." One or more of such sprocket wheels may be driven or braked during a cable wrapping or laying operation using auxiliary sprocket wheels mounted on correspondingly the same shaft.

In the arrangement shown in FIGS. 9–11 the wire or cable extends substantially straight in that region between sprocket wheels 101, 102. To increase the overall griping power the wire instead of thus being straight may have an undulatory pattern in this same region occasioned, as illustrated in FIG. 12, by the chain rollers 104 riding on undulating spaced tracks on the stationary support member 105E (corresponding to element 105 in FIG. 10); and likewise the finger rollers 132 associated with each of the fingers may ride on a track 132A complementary to such tracks 170 such that the variation in stress in springs 140 be reduced to a minimum, i.e., a trough portion of track 170 should correspond to a crest portion of the finger roller track 132A and vice versa as illustrated in FIG. 13.

While the terms wire, cable and strand have been used interchangeably it is understood that the invention claimed herein is applicable to the gripping of any of these elements, either when metallic or non-metallic. Also while FIGS. 9–11 illustrate a chain other like elements such as, for example, a belt passing over pulleys in some cases may be used in practice of the broader aspects of the present invention.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. A gripping device of the character described including a circular frame having two internal oppositely disposed walls each sloping towards the center of said circular frame and both defining generally a V-shaped peripheral groove; a plurality of pairs of gripping jaws within and extending around said peripheral groove; each jaw of each pair of jaws being slidably mounted on a corresponding one of said walls; each pair of said jaws having two oppositely disposed faces each sloping towards the center of said circular frame and both defining generally a V-shaped peripheral jaw slot; jaw retention means on said frame; individual resilient operated means for each of said pair of jaws acting between said frame and said jaws and urging the same in a direction extending radially outwardly of said frame against said retention means.

2. A device as set forth in claim 1 in which said frame includes a center spoke structure on opposite sides of which is mounted a pair of plates; said plates defining said peripheral groove; and said retention means is mounted on said plates.

3. A device as set forth in claim 1 in which said spring operated means includes an individual pressure plate interposed between a pair of said jaws and one end of each of a pair of coil compression springs; the other ends of said coil compression springs bearing against said frame.

4. A device as set forth in claim 1 in which each jaw of each pair of jaws has a tongue member thereon slidably mounted within a groove portion in a corresponding one of said frame walls.

5. A device as set forth in claim 3 in which each jaw of said pair of jaws has a tongue member which extends in a direction between said pair of springs and which is slidably mounted within a grooved portion in a corresponding one of said frame walls.

6. A device as set forth in claim 2 in which said retention means includes a pair of members generally L-shaped in cross-section; a corresponding one of said pair of members being releasably secured on a corresponding one of said plates.

7. A device as set forth in claim 1 including a sprocket wheel coaxially mounted with and on said circular frame.

8. In combination with a device as set forth in claim 1, spring urged means extending into said jaw slot for pressing wire entering said jaw slot into engagement with a pair of said jaws, the force exerted by said spring urged means on said wire exceeding the force developed by said spring operated means and acting on the same pair of jaws.

9. In a gripping system of the character described wherein a plurality of pairs of wire gripping jaws defining a circular wire slot are slidably mounted on the periphery of a structure and are resiliently urged outwardly by resilient means, the improvement which resides in placing a wire engaging element within said slot to press wire between said element and a pair of said jaws with the force acting on said element being commensurate with the force developed on said pair of jaws by said resilient means.

10. A system as set forth in claim 9 in which said element comprises a roller pressed by a spring which exerts a force on the wire greater than that force developed by said resilient means.

11. A system as set forth in claim 9 in which said wire gripping jaws are on a rotatable structure.

12. A system as set forth in claim 9 in which said wire gripping jaws are on an endless member passing around a pair of wheels.

13. A system as set forth in claim 12 in which said undulatory motion is imparted to said jaws in their movement between said wheels.

14. In a system of the character described wherein it is desired to grip a continuous length of wire under tension the improvement which resides in providing wire gripping jaws for engaging and gripping spaced portions of said wire along its length, and imparting an undulatory motion to said jaws when and as the same grip the wire to maintain said wire under tension and lessen the possibility of the tensioned wire slipping in the jaws.

15. In a system of the character described an endless chain, spaced rotating means around which said chain passes, a plurality of wire gripping means on said chain, a second endless chain, spaced rotating means around which said second chain passes, a plurality of wire engaging fingers mounted on said second chain and extending into a corresponding one of said gripping devices, resilient means urging said fingers into engagement with wire gripped by a corresponding gripping means.

16. A system as set forth in claim 15 including means for imparting an undulatory movement to said gripping means in movement from one of said rotating means to the other one of said rotating means.

References Cited

UNITED STATES PATENTS

| | | | |
|---|---|---|---|
| 2,253,333 | 8/1941 | Jaeckel | 198—179 |
| 2,884,120 | 4/1959 | Bruestle | 226—184 X |

ALLEN N. KNOWLES, Primary Examiner